United States Patent [19]

Fiddler

[11] 4,007,952
[45] Feb. 15, 1977

[54] COMPACT MULTIPLE TUBE CONNECTOR APPARATUS

[76] Inventor: Theodore E. Fiddler, 1268 Suffield Drive, Birmingham, Mich. 48009

[22] Filed: Jan. 9, 1975

[21] Appl. No.: 539,575

[52] U.S. Cl. .......................... 285/137 R; 285/319; 285/423
[51] Int. Cl.² ........................................ F16L 39/00
[58] Field of Search ............. 285/137 R, 197, 200, 285/319, 423, 328; 137/608, 609

[56] References Cited

UNITED STATES PATENTS

| | | | |
|---|---|---|---|
| 3,469,863 | 9/1969 | Riester et al. | 285/137 R |
| 3,820,828 | 6/1974 | Fiddler | 285/137 R |

FOREIGN PATENTS OR APPLICATIONS

| | | | |
|---|---|---|---|
| 1,183,003 | 1/1959 | France | 285/137 R |
| 1,559,036 | 1/1969 | France | 285/197 |

Primary Examiner—Andrew V. Kundrat
Attorney, Agent, or Firm—William T. Sevald

[57] ABSTRACT

Apparatus for sealably interconnecting a plurality of tubes between systems enabling complete manufacture of one portion of a system with associated tubes separately from the other portions of a system facilitating complete manufacture of sub-assemblies and easy accurate interconnection upon final assembly. The apparatus includes a multiple tube connector resilient block and clamp bar for one sub-assembly. The block is sealably connected on a base plate which connects the block and tubes to a device which uses and/or controls the channeling between the tubes connected thereto. The apparatus seals the channels opening through the face of the resilient block in which the tubes are sealed against the relatively non-resilient base plate surface in alignment with ports in the base plate. The base plate has means for gripping the clamp bar on the block, ports, and a raised bead and a counterbore at each port to insure alignment between the channels and ports and to provide against occluding a channel or port by flow of the resilient block under clamping force. Two blocks with tubes and a base plate are connectable to opposite sides of a double sided base plate for interconnecting tubes intermediate spans of tubes such as at the fire wall of an automobile and the bulkhead of a plane or ship.

3 Claims, 16 Drawing Figures

U.S. Patent    Feb. 15, 1977    Sheet 1 of 2    4,007,952
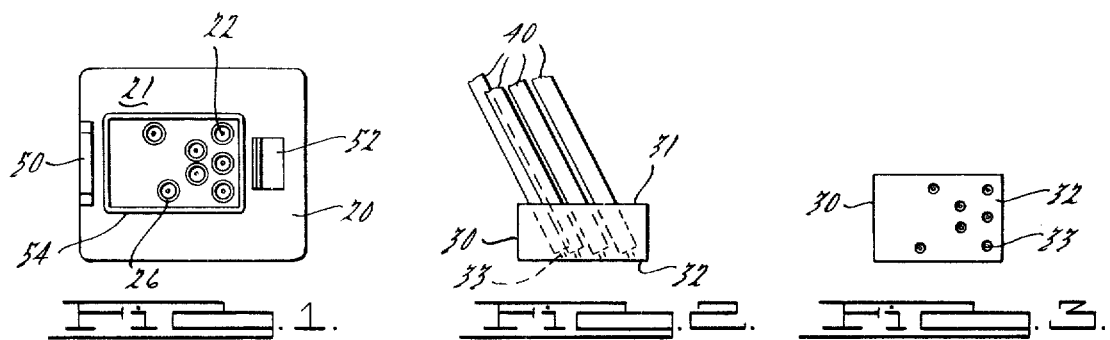
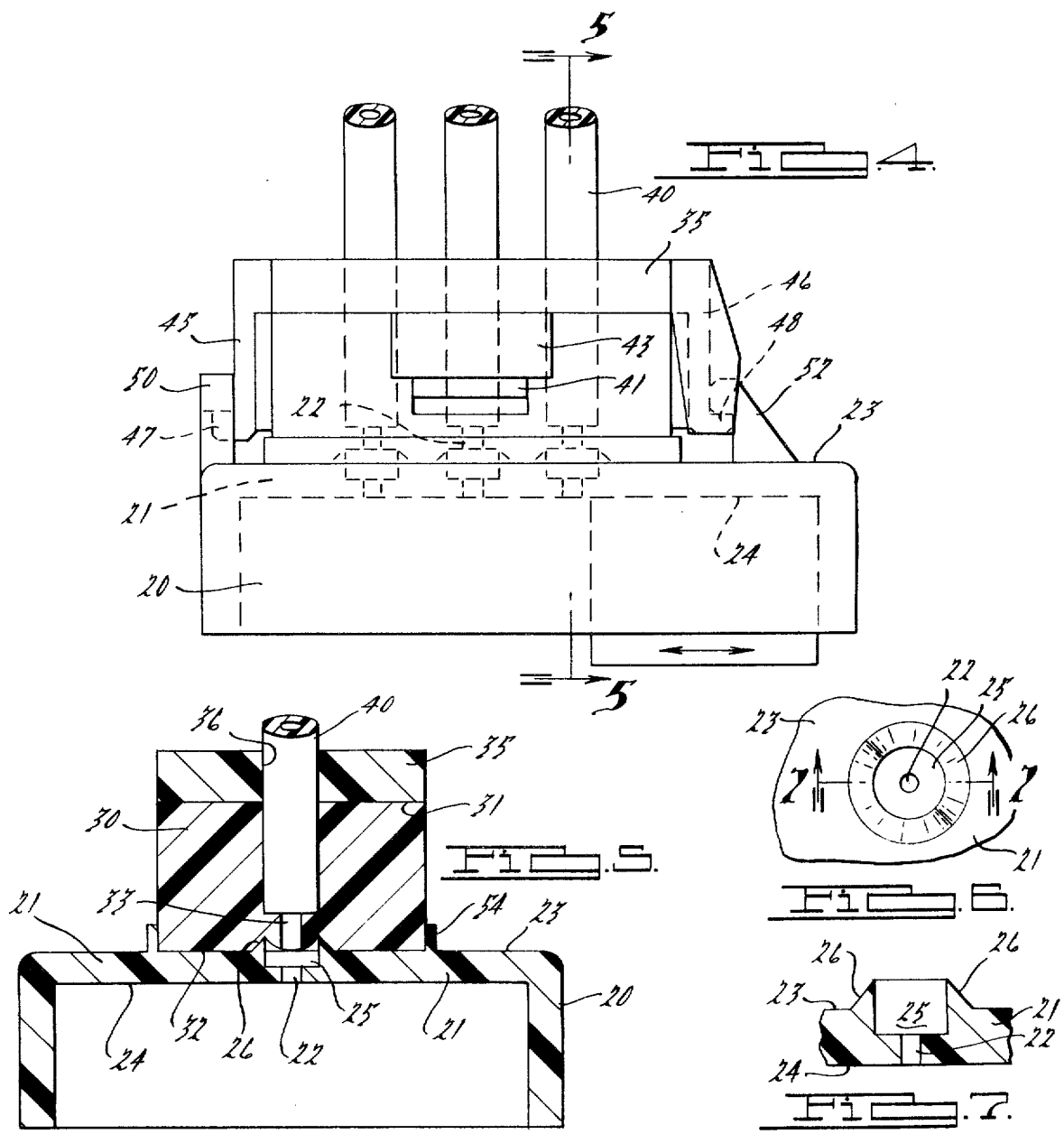

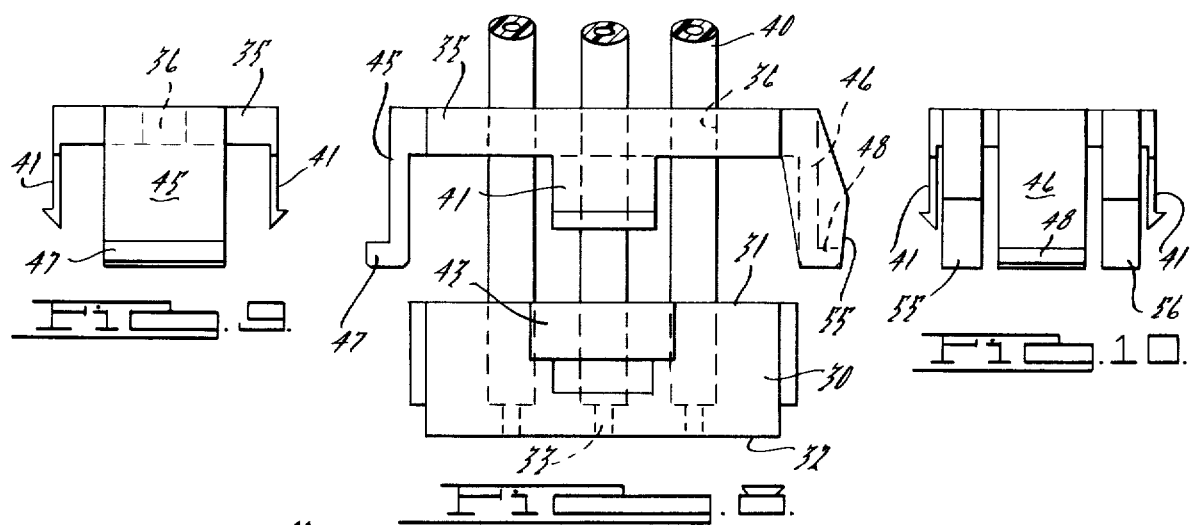
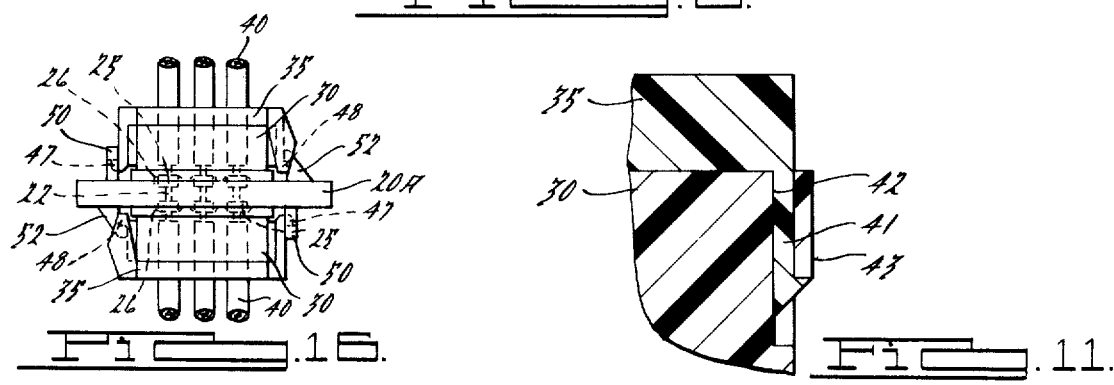
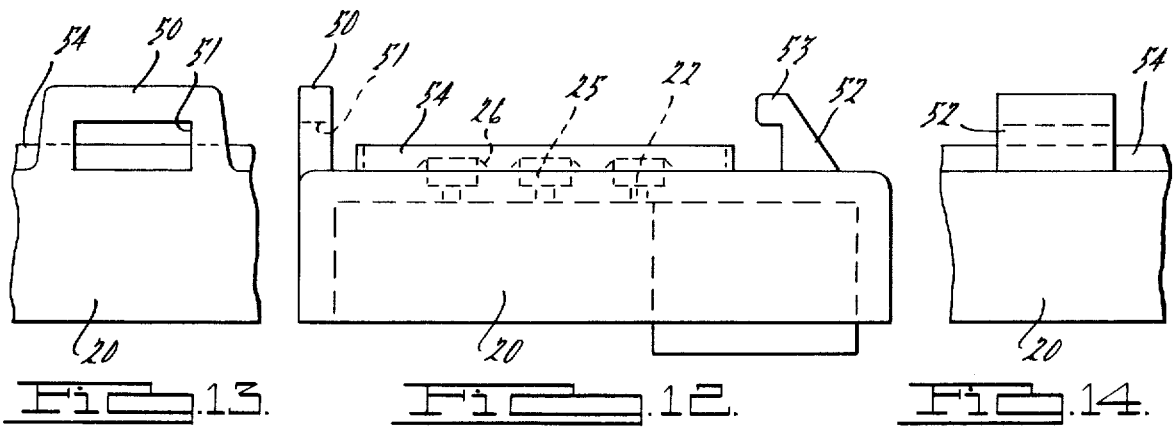
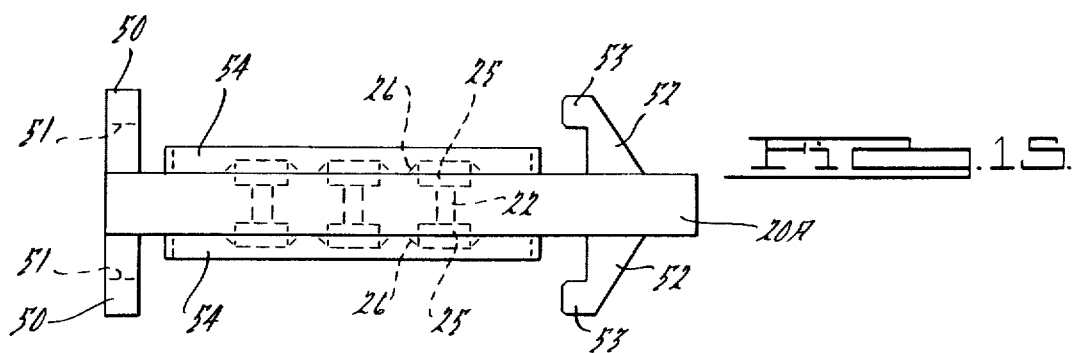

COMPACT MULTIPLE TUBE CONNECTOR APPARATUS

BACKGROUND OF THE INVENTION

The applicant herein is the patentee in U.S. Pat. No. 3,820,828, for "Compact Multiple Connector Apparatus for Multiple Channels and Tubes" dated June 28, 1974.

Fluid pressure force (FPF) systems, such as in the automotive field to control air conditioning units and heaters in conjunction with one another, employ multiple tubes to conduct the FPF and combination controller devices to selectively apply the FPF to various components. Ten to twenty tubes may be used and heretofore they have been connected to the controller devices by inserting nipples on the controllers into the holes in the ends of the tubes. The aperture in the nipple is the size channel required to conduct sufficient FPF in the system. The outside diameter of the nipple is much larger than the internal diameter of the nipple channel. The tube or hose must be of a size to have a hole large enough to receive the O.D. of the nipple. The tube or hose then must have a larger outside diameter to give the tube or hose sufficient wall thickness to provide sufficient strength to sealably engage the nipple. Also there must be relatively wide spacing between the tubes to insure that the tubes are sealed off relative to one another. Thus the number of hoses or tubes and their relatively large outside diameters, the space needed to force them on the nipples, and the space between tubes requires a large area compared to the size of the channel itself. Thus the size of the controller body is large, the space between the channels is large, and the hoses or tubes are large. Attempts have been made to reduce the O.D. of the nipples, but this leaves the nipples too structurally weak to support the hoses or tubes and the nipples break off. Also the size of the nipple apertures have been reduced and this reduces channel size and makes molding the nipple apertures even more difficult as spring-wires are required in the molds or dies and they flex about creating inaccuracies and scrap parts and the wires break off allowing nipples to be molded without apertures. Thus the prior art has a long-felt want for tube and channel connectors and sealing means which provide small bodies having close spaced channels sealably connected to tubes of small outside diameter wherein the tubes are not subjected to rupturing forces.

The prior art devices thus are complicated in design and structure; expensive to manufacture; difficult to install, replace, and repair; and are undesirably large in hose or tube size and in part size.

In an effort to reduce part size, the latest prior art devices which connect large numbers of tubes, such as 10 to 20, employ stepped, radially staggered, and axially banked connectors expending side-wise outwardly from the adjacent surface of the part. These connectors pyramid the tubes toward the surface from a wide-spaced arrangement remote from the surface. These connectors are confusing, cumbersome, expensive, and time-consuming to manufacture, install, and repair and objectionally faulty in use. Also they do not adequately reduce the part size.

SUMMARY OF THE PRESENT INVENTION

The present invention is a substantial improvement in the art of connecting tubes to devices and to other tubes as it enables very small devices and tubes to be used thereby reducing part size, lowering material cost, facilitating inexpensive manufacture, reducing weight, and reducing the space required.

The apparatus of the invention is simple in design and construction, provides improved small size, better sealing, and savings in cost for users which is extremely important and which in the case of the automobile industry will amount to millions of dollars over the cost of prior art devices per company per model year as presently advised.

The apparatus of the invention allows a large plurality of tubes to be sealably connected in close proximity to ports or other tubes via a relatively elastic block being pressed against a relatively non-elastic base plate with the ports of the plate aligned with the channels of the block so that cross-communication between the tubes is prevented with each tube housed in the block in individually sealed communication with a port in the base plate.

In airplane, boat, and automobile manufacture, multiple tubes are run in groups from one place to another and in particular through compartment walls, bulkheads, and fire walls. Various assemblies are made on opposite sides of the barriers. The invention facilitates fully integrating one portion of systems in one sub-assembly on one side of a barrier and another sub-assembly on the other side of a barrier so that when the sub-assemblies are put together, all that has to be done to properly interconnect them is to connect up the block and clamp bar to the base plate and the tubes leading from one portion are correctly connected to the ports or tubes of the other portion.

These and other objects of the invention will become apparent by reference to the following description of the illustrated exemplary embodiments of the invention taken in connection with the accompanying drawings.

DESCRIPTION OF THE DRAWINGS

FIG. 1 is a top plan view of a base plate, showing ports surrounded by a counterbore and an upstanding bead and showing a portion of clamping means at either end of the base plate.

FIG. 2 is a side elevational view of an elastic block with attached tubes lying at a slant showing the channels in dotted lines illustrating the block used with the base plate of FIG. 1.

FIG. 3 is a bottom plan view of the block seen if FIG. 2, showing the channels opening through the bottom face of the block.

FIG. 4 is a greatly enlarged side elevational view of the assembly of the base plate, block, and tubes of FIGS. 1–3, with four tubes deleted for simplicity of illustration and additionally showing a clamping bar in clamping relationship; indicating the internal ports and channels in broken lines; and showing the tubes lying normal to the block instead of at a slant.

FIG. 5 is a cross-sectional view of the device seen in FIG. 4, taken on the line 5—5 thereof, showing the tube in elevation.

FIG. 6 is a partial greatly enlarged plan showing of one port, counterbore, and raised bead in the base plate as seen in FIG. 5 with the base plate broken away.

FIG. 7 is a cross-sectional view of the portion shown in FIG. 6 taken on the line 7—7 thereof.

FIG. 8 is an exploded side elevational view of the block, tubes, and clamp bar as seen in FIG. 4.

FIG. 9 is an end elevational view of the clamp bar seen in FIG. 8 from the left side.

FIG. 10 is an end elevational view of the clamp bar seen in FIG. 8 from the right side.

FIG. 11 is an enlarged showing of the mechanical interconnection between the central side tangs of the clamp bar and the pocket and web of the block when assembled, with parts broken away.

FIG. 12 is a side elevational separate view of the base plate as seen in FIG. 4 additionally showing a valve body bi-directionally moveable relative to the ports shown in broken lines.

FIG. 13 is an end elevational view of the base plate seen in FIG. 12 from the left side.

FIG. 14 is an end elevational view of the base plate seen in FIG. 12 from the right side.

FIG. 15 is a side elevational view of a two sided base plate for connection to a clamp plate, block, and tube assembly on both sides thereof; and FIG. 16 is a reduced side elevational view of the dual base plate of FIG. 15 assembled with two blocks, two clamp plates, and two sets of tubes.

DETAILED DESCRIPTION OF THE ILLUSTRATED EMBODIMENTS

Referring now to the drawings wherein like numerals refer to like and corresponding parts throughout the several views, the exemplary devices and apparatus disclosed therein to illustrate preferred embodiments of the invention are first described adapted to a controller device and then described as interconnecting groups of tubes.

A controller base plate 20, FIGS. 1, 4, 5, and 12, has a wall 21, ports 22, leading through the wall 21. The wall 21 has opposite surfaces 23 and 24. The ports 22 open at the surfaces 23 and 24. A counterbore 25 is formed in the surface 23 at each port 22. A raised bead 26 surmounts the surface 23 and surrounds the counterbore 25.

An elastic block 30, FIGS. 2, 3, 4, 5, and 8, has a top face 31, a bottom face 32, and channels 33 leading between and opening through the faces 32 and 31. A clamp bar 35 overlies the top face 31 of the block 30 and has holes 36 aligned with the openings of the channels 33 through the top face 31 of the block 30. The channels 33 may be enlarged to receive the tubes 40 as shown as desired or channels 33 may be the same size from end to end as the tubes 40.

The clamp bar 35 has a tang 41 on either side, FIG. 11, and the block 30 has an indentation 42 and a strap 43 overlying the indentation 42. The tangs 41 fit in the indentations 42 under the straps 43 and this mechanically interconnects the clamp bar 35 and the block 30 prior to the insertion of the tubes 40. The tubes 40 are then inserted through the holes 36 of the clamp bar 35 into the channels 33 of the block 30 and sealably bonded therein.

The clamp bar 35 has a depending arm 45 at one end and a depending arm 46 at the other end and these arms are preferably of different widths, FIGS. 8–10. The arms 45 and 46 overlie the ends of the block 30, FIG. 4. A finger 47 extends from the arm 45 and a finger 48 extends from the arm 46. The base plate 20 has an upstanding leg 50 with a socket 51 therein and an upstanding leg 52 with a projecting foot 53 thereon. A peripheral wall 54 is also carried on the surface 23 of the base plate 20 sized to receive the block 30. Bosses 55 and 56 depend from the clamp bar 35 on either side of the arm 46 and prevent incorrect connection of the block 30 and clamp bar 35 to the base plate 20.

The clamp bar 35 and block 30 are first assembled with the tang 41 on the clamp bar 35 seated in the indentation 42 of the block 30 with the projecting tip of the tang 41 lying under the strap 43 of the block. This holds the block 30 and clamp bar 35 together. The tubes 40 are then inserted through the holes 36 of the clamp bar 35 into the channels 33 of the block 30. This completes this sub-assembly and it may now be annexed to the base plate 20 by locating the block 30 inside the peripheral wall 54 slipping the finger 47 on the arm 45 into the socket 51 of the leg 50 on the base plate 20 and then snapping the finger 48 of the arm 46 under the foot 53 of the leg 52 on the base plate 20. This completes full assembly such as to a controller or other device.

The two sided base plate 20A, FIGS. 15 and 16, provides a link to sealably interconnect two groups of tubes 40 on either side of the base plate 20A which have previously been sub-assembled with a block 30 and a clamp bar 35 on either side of the base plate 20A such as at the fire wall of an automobile, the panels of a plane, and/or the bulkheads of a ship. Upon mounting the blocks 30 on opposite sides of the base plate 20A as previously described, the tubes are sealably interconnected in proper desired selective inter-communication.

In manufacture, the tubes may be color or number coded and the clamp bar holes may be similarly identified so that all an assembler has to do is put each coded tube in the like coded hole as the design and engineering of the various parts has established the desired circuits.

The invention is limited only by the scope of the appended claims.

I claim:

1. Apparatus for connecting a plurality of tubes to a member such as a control device, supply elements, supplied elements, other tubes, and the like, comprising, a base plate of relatively non-elastic material having opposite top and bottom planar surfaces and ports leading between and opening through said planar surfaces;

a block of relatively elastic material having a top planar face, a bottom planar face, and counter-bored channels leading between and opening through said planar faces; said counter-bored channels having a relatively larger I.D. to receive a tube and a relatively smaller I.D. to communicate with said ports in said base plate:

said block bottom planar face being superposed on said top planar surface of said base plate with the smaller I.D. openings of said channels of said block aligned with said ports of said base plate:

a clamp bar overlying said top planar face of said block having tube receiving holes aligned with the openings of said channels at said top planar face of said block;

tubes inserted in said larger I.D. of said channels of said block through said holes in said clamp bar;

interconnecting clamping means on said clamp bar and said base plate forceably urging them toward one another to compress said block between said clamp bar and said base plate with said bottom planar face of said block at said smaller I.D. of said channels forced into sealing relationship with said top planar surface on said base plate to sealably connect said ports in said base plate with said channels and said tubes in said block, and a raised bead on said top planar surface of said base plate surrounding each said port in said base plate; said beads surrounding the smaller I.D. opening of said channels through said bottom of said block; said raised bead at each said port engaging said bottom planar face of said block in sealing relationship surrounding each said channel smaller I.D. opening in said block with increased sealing force due to the raised position of said beads and small area of contact between each said bead and said bottom planar face of said block; said smaller I.D. opening of said block leaving said block with a strong mass of material to sealably engage said raised bead on said base plate.

2. In apparatus as set forth in claim 1, said top planar surface of said base plate having a counterbore at said port providing enlarged sealed-off area in communication with the opening of each said channel in said bottom planar face of said block with its aligned said port in said base plate to insure against misalignment between the openings of said channels and said ports and to obviate movement of said block occluding any said channel relative to its aligned said port under clamping forces.

3. In apparatus as set forth in claim 1, a like second relatively elastic block having a bottom planar face overlying said bottom surface of said base plate;

said second block having like counter-bored channels opening at said bottom planar surface of said base plate in alignment with said ports in said base plate, a like second clamp bar overying said second block having holes for leading tubes into the larger I.D. of channels of said second block;

tubes in the larger I.D. of said counter-bored channels of said second block;

like second clamp means for urging said second block against said bottom planar surface of said base plate to force said second block into sealing relationship with said bottom planar surface of said (block) base plate to sealably connect said tubes in said channels of said second block with said ports in said base plate; and a raised bead on said top planar surface of said base plate surrounding each said port in said base plate; said beads surrounding the smaller I.D. opening of said channels through said bottom of said block; said raised bead at each port engaging said bottom planar face of said block in sealing relationship surrounding each said channel smaller I.D. opening in said block with increased sealing force due to the raised position of said beads and small area of contact between each said bead and said bottom planar face of said block; said smaller I.D. opening of said block leaving said block with a strong mass of material to sealably engage said raised bead on said base plate;

said tubes in said first block thereby being selectively sealably connected to said tubes in said second block.

* * * * *